No. 736,413. PATENTED AUG. 18, 1903.
C. LICHTENSTADT.
MACHINE FOR TREATING FABRICS FOR RENDERING THEM
WATER REPELLENT.
APPLICATION FILED APR. 28, 1902.
NO MODEL. 8 SHEETS—SHEET 1.
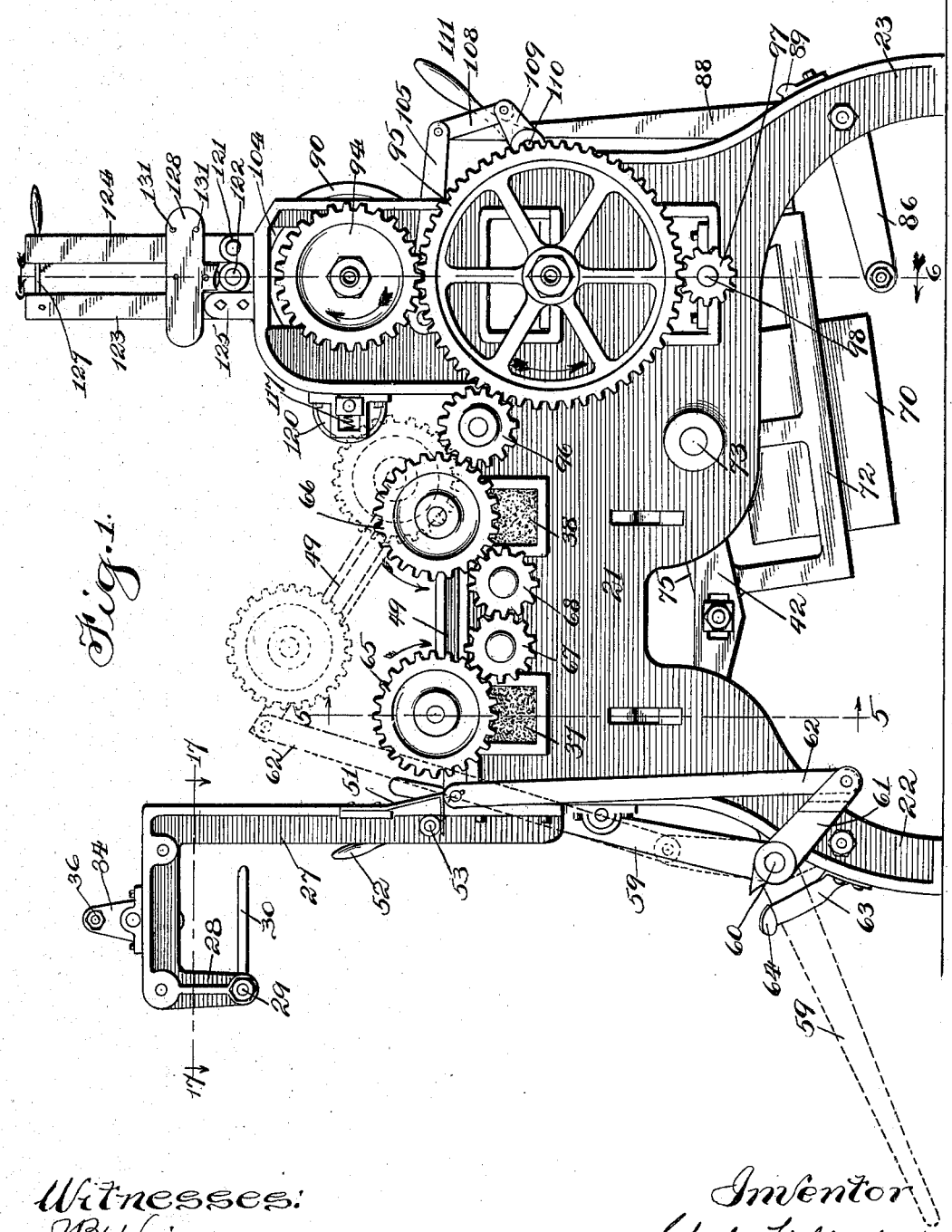
Witnesses:
J B Weir
Ira D Perry
Inventor
Charles Lichtenstadt
by Bond, Adams, Pickard & Jackson
his Attys.

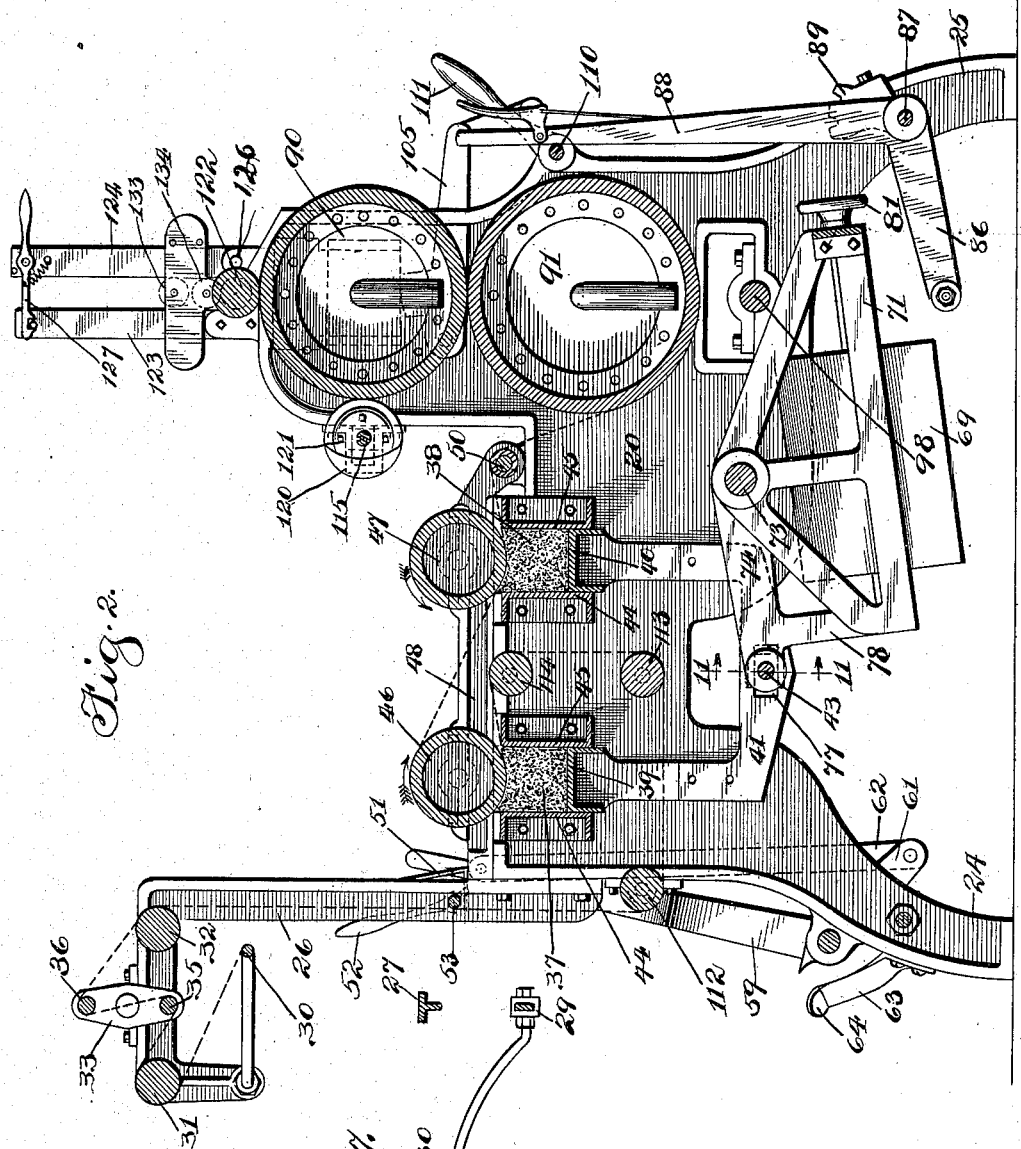

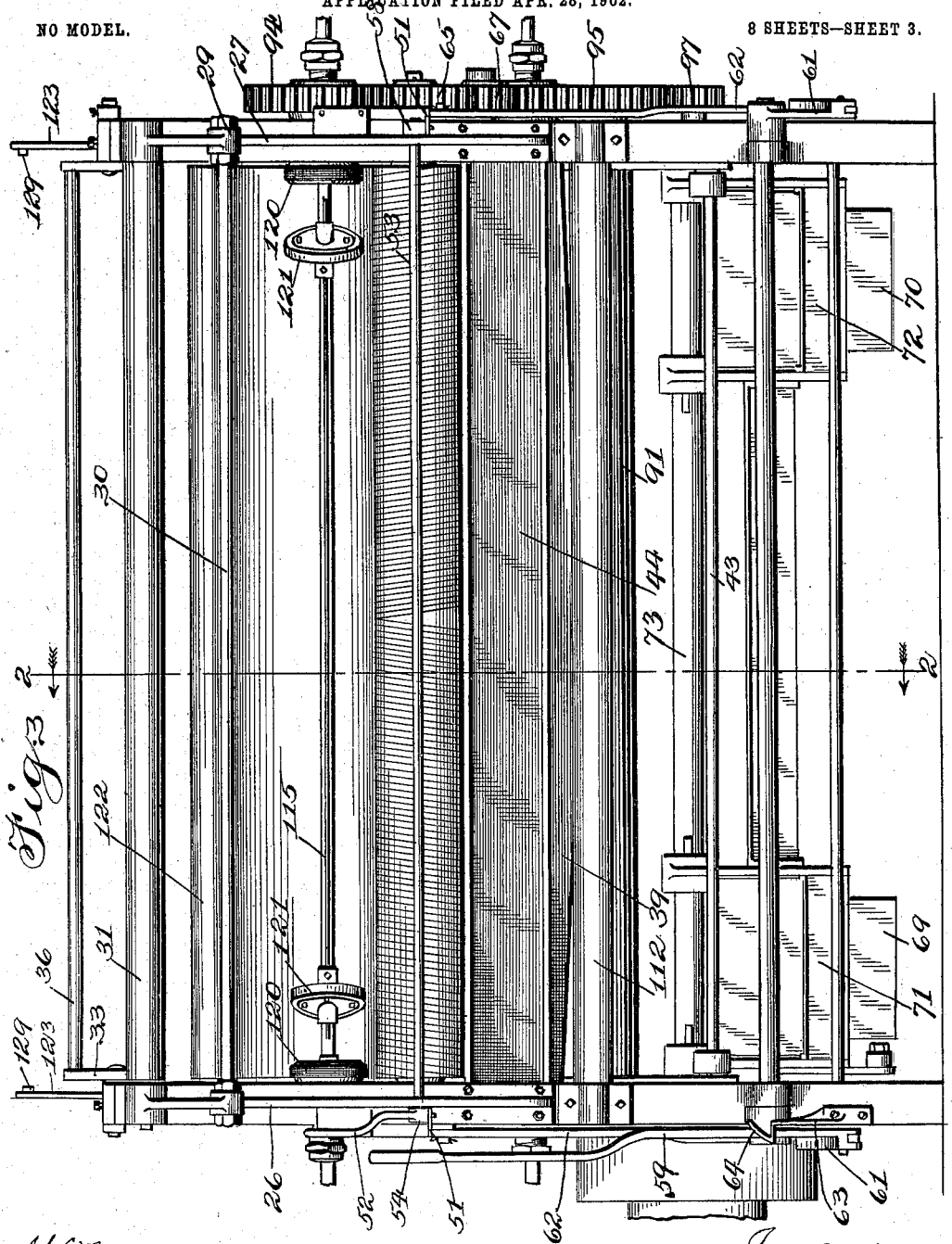

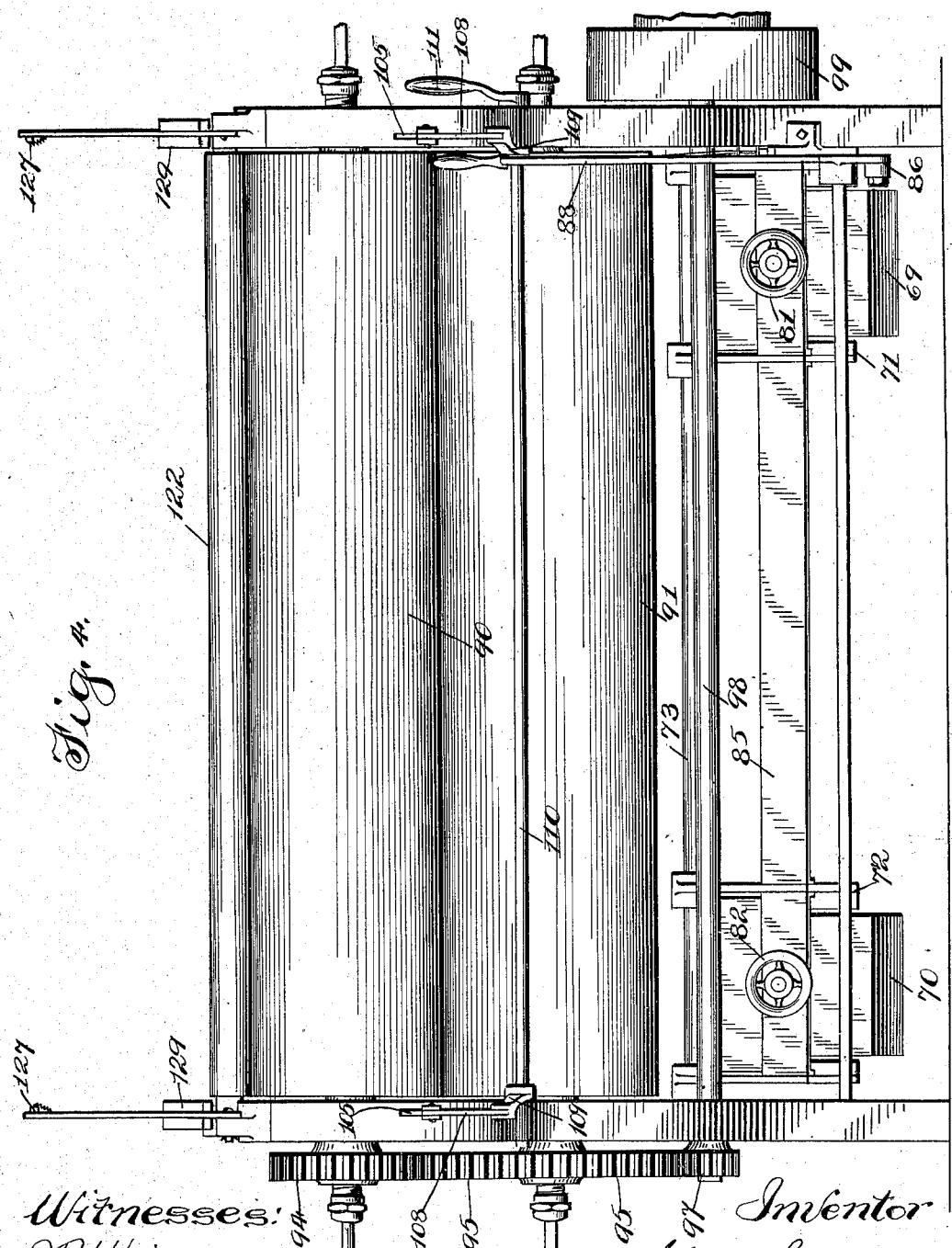

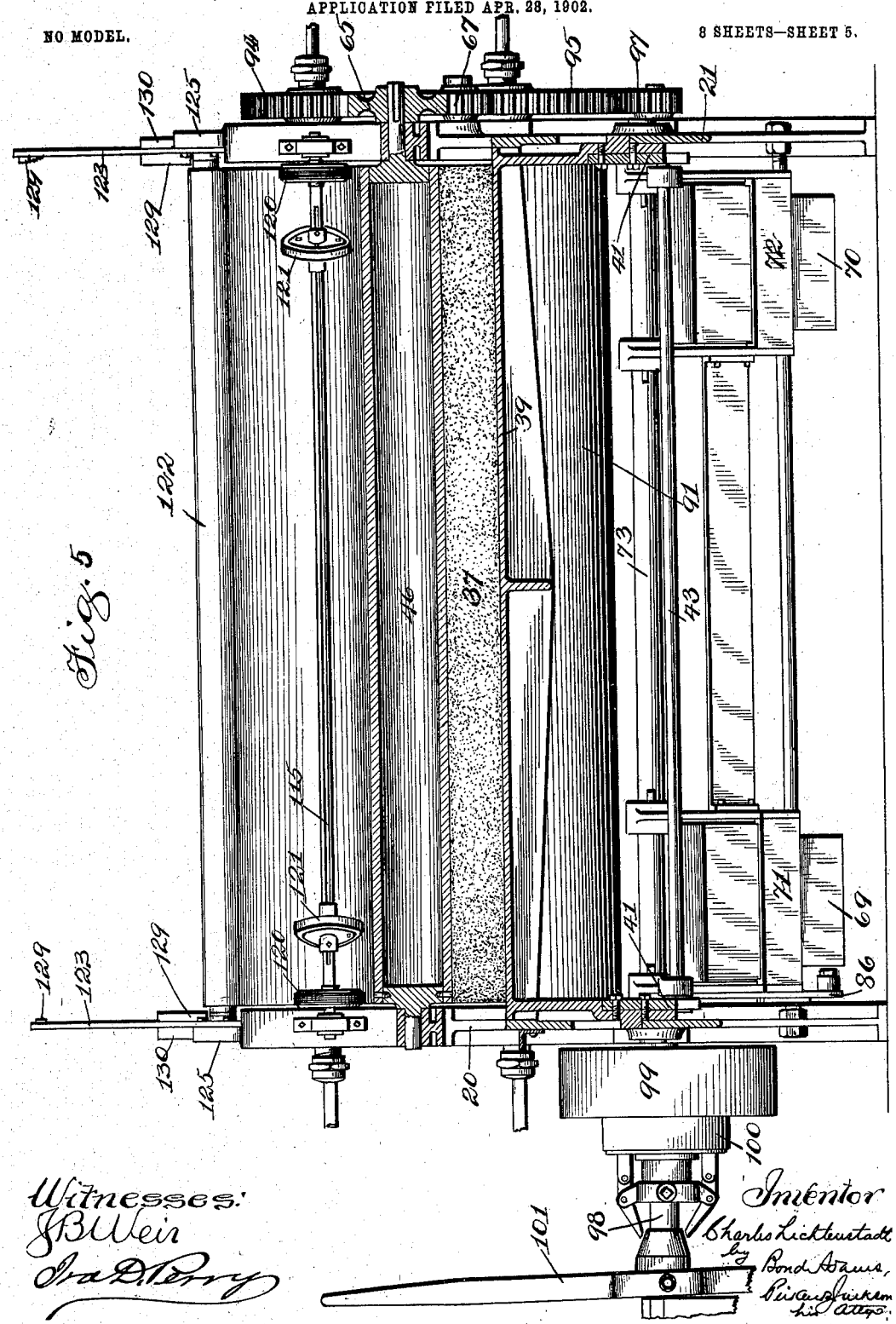

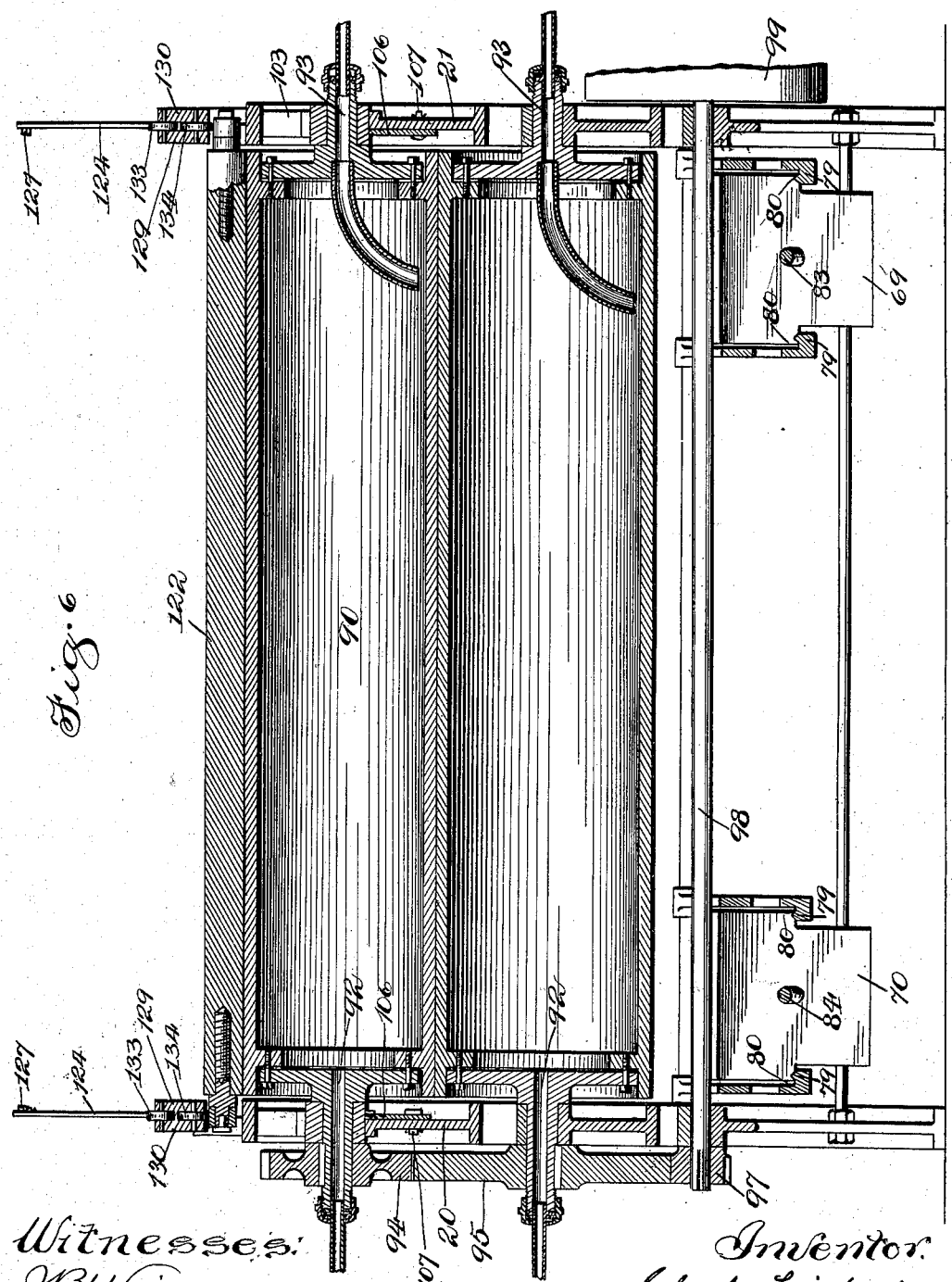

No. 736,413. PATENTED AUG. 18, 1903.
C. LICHTENSTADT.
MACHINE FOR TREATING FABRICS FOR RENDERING THEM
WATER REPELLENT.
APPLICATION FILED APR. 28, 1902.
NO MODEL. 9 SHEETS—SHEET 7.
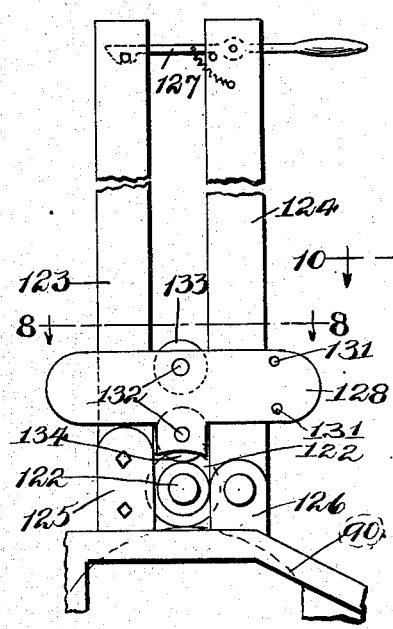
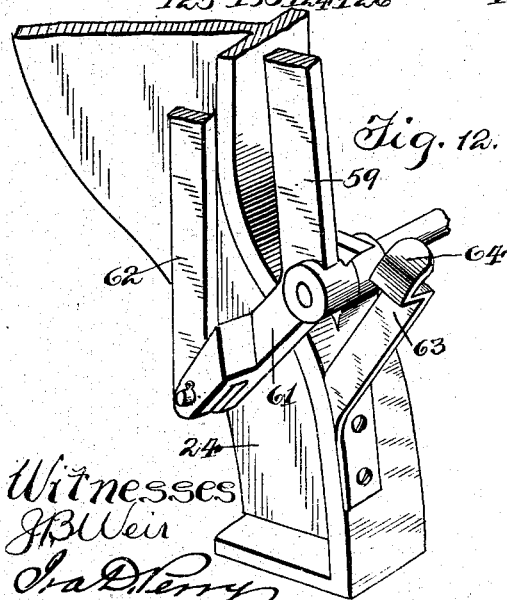
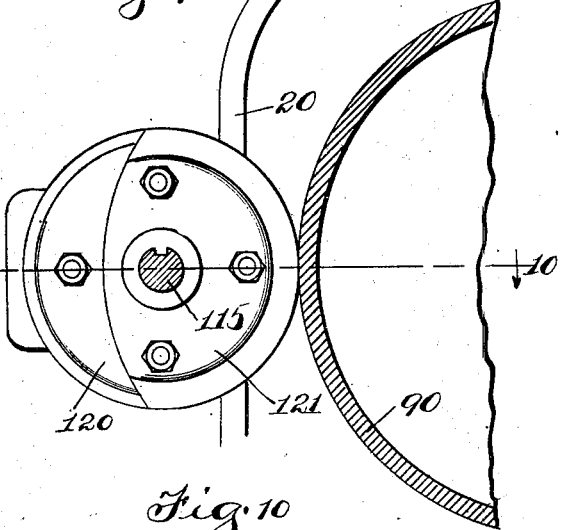
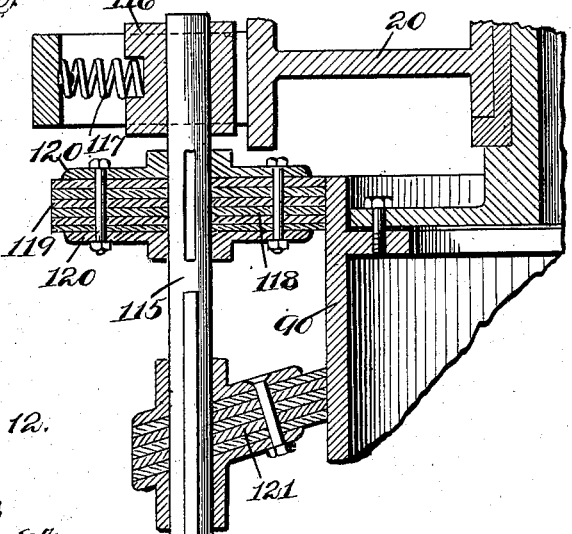

No. 736,413. PATENTED AUG. 18, 1903.
C. LICHTENSTADT.
MACHINE FOR TREATING FABRICS FOR RENDERING THEM WATER REPELLENT.
APPLICATION FILED APR. 28, 1902.
NO MODEL. 8 SHEETS—SHEET 8.
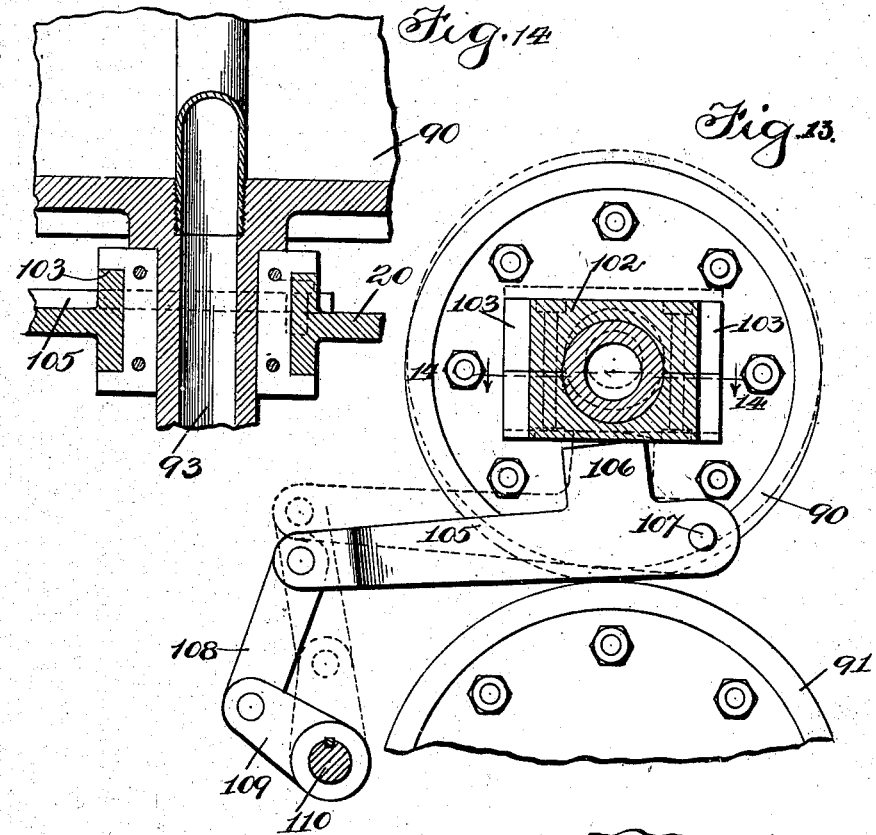
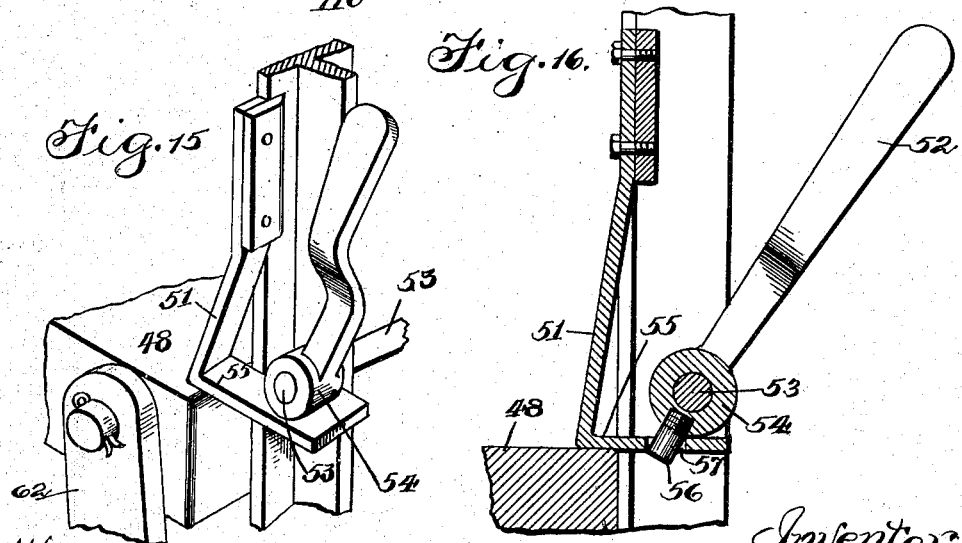

No. 736,413. Patented August 18, 1903.

UNITED STATES PATENT OFFICE.

CHARLES LICHTENSTADT, OF CHICAGO, ILLINOIS.

MACHINE FOR TREATING FABRICS FOR RENDERING THEM WATER-REPELLENT.

SPECIFICATION forming part of Letters Patent No. 736,413, dated August 18, 1903.

Application filed April 28, 1902. Serial No. 104,998. (No model.)

*To all whom it may concern:*

Be it known that I, CHARLES LICHTENSTADT, a citizen of the United States, and a resident of Chicago, in the county of Cook and State of Illinois, have invented certain new and useful Improvements in Machines for Treating Fabrics to Render Them Water-Repellent, of which the following is a specification, reference being had to the accompanying drawings.

My invention relates to machines for treating fabrics to render them water-repellent, and has for its object to provide an improved machine by which the fabrics may be continuously treated and the water-repellent substance quickly and efficiently applied.

In my improved machine I use a substance to render fabrics water-repellent having the composition described in my Patent No. 662,692, dated November 27, 1900. Such substance has somewhat the consistency of wax, and in practice it is used in the form of bars or bricks somewhat greater in length than the width of the fabric to be treated.

Generally speaking, my improved machine consists of suitable mechanism for holding the bars of composition arranged adjacent to suitable pressing mechanism, by which the fabric is properly pressed against the surface of the composition as it passed through the machine, also calendering-cylinders, between which the fabric is conducted after the composition is applied. If one surface only of the fabric is to be treated, a single bar of composition, with a single presser-roll, is used; but where both surfaces are to be treated two of such bars and presser-rolls are employed.

In addition to the generic features of construction above mentioned my improved machine embodies many other improvements relating to the supporting devices for the bars of composition, to mechanism for adjusting the pressure with which the composition is applied to the fabric, to the mounting of the presser-rolls and calendering-cylinders, to the devices for guiding and directing the fabric through the machine, and to the rewinding devices by which the fabric is rolled up after having been treated. All these features of construction will be hereinafter fully set forth.

In the accompanying drawings, Figure 1 is a side elevation of my improved machine. Fig. 2 is a longitudinal vertical section on line 2 2 of Fig. 3. Fig. 3 is an end view showing the feed end of the machine. Fig. 4 is an end view showing the opposite or delivery end of the machine. Fig. 5 is a vertical cross-section on line 5 5 of Fig. 1. Fig. 6 is a vertical cross-section on line 6 6 of Fig. 1, showing the calendering-cylinders in longitudinal section. Fig. 7 is an enlarged detail, being a partial side elevation, illustrating the rewinding devices. Fig. 8 is a horizontal section on line 8 8 of Fig. 7. Fig. 9 is an enlarged detail, being a partial view of the upper calendering-cylinder, illustrating one of the feed-rollers. Fig. 10 is a horizontal section on line 10 10 of Fig. 9. Fig. 11 is a section on line 11 11 of Fig. 2. Fig. 12 is a perspective view illustrating a portion of one of the operating-levers, with the latch therefor. Fig. 13 is an end view of the upper calendering-cylinder and a part of the lower one, illustrating the devices for vertically adjusting the upper cylinder, the bearing-block thereof being in section. Fig. 14 is a section on line 14 14 of Fig. 13. Fig. 15 is a perspective view illustrating the locking devices for holding the presser-rolls down in operative position. Fig. 16 is a vertical section thereof, and Fig. 17 is a sectional view on line 17 17 of Fig. 1.

Referring to the drawings, 20 21 indicate the side frames of the machine, which are suitably shaped to support the parts of the mechanism and are provided with supporting-legs 22 23 24 25. The side frames are spaced apart a sufficient distance to accommodate the widest fabric which it is desired to treat. I prefer to set the side frames about seventy inches apart, so as to accommodate very wide fabrics; but they may be separated to a greater or less extent, as may be desired.

26 27 indicate brackets, one of which is secured to each of the side frames at the feed end of the machine, as shown in Figs. 1 and 3. Said brackets rise from the side frames for a considerable distance, and their upper ends extend outward and downward, as shown in Fig. 1, giving said brackets somewhat the appearance of an inverted L. In the ends of the downwardly-extending arms 28 of the brackets 26 27 is secured a rod 29, which braces and strengthens said brackets, and also a curved rod 30, which extends from one of said arms to the other and is bowed toward the vertical portions of the brackets 26 27, as shown in Fig. 17. The rod 30 is what may be termed a "spreader," as its function is to open out and spread the fabric as it passes into the machine. It should be explained that the fabric before being treated is usually folded longitudinally, so that it is necessary to unfold it or spread it as it passes into the machine. This is accomplished as it passes upward over the spreader-rod 30.

31 32 indicate guide-rolls carried by the brackets 26 27 for guiding the fabric. 33 34 indicate cross-heads vertically mounted on the horizontal portions of the brackets 26 27, as shown in Figs. 1 and 2, which cross-heads carry guide-rods 35 36, over which the fabric is guided. These guide rolls and rods provide the tension necessary to prevent the fabric from passing too freely into the machine and cause it to be held taut as it is drawn through the machine.

37 38 indicate the bars of composition which, as shown in Figs. 2 and 5, extend transversely of the machine between the side frames 20 21. Said bars are supported upon supporting-plates 39 40, carried at the upper ends of U-shaped frames 41 42, the frame 41 being arranged adjacent to the inner surface of the side frame 20, while the frame 42 is adjacent to the inner surface of the side frame 21. Said U-shaped frames 41 42 are connected by a transverse shaft 43, as shown in Figs. 2, 3, and 5, so that they are held properly apart and can move in unison, as hereinafter described. The upper ends of the U-shaped frames 41 42 fit between guide-plates 44 45, so that they are caused to move vertically. Said guide-plates 44 45 extend across the machine, having their ends connected to the side frames 20 21, and form the sides of pockets in which the bars of composition are fitted, the plates 39 40 serving as the bottoms of said pockets.

It will be evident from the foregoing description that by moving the U-shaped frames 41 42 vertically the bars of composition can be raised or lowered as desired, thereby elevating or depressing the upper surfaces of said bars which engage the fabric.

46 47 indicate presser-rollers, the roller 46 being mounted in the frame of the machine above and adjacent to the bar of composition 37, while the roller 47 is similarly mounted with reference to the composition bar 38. The ends of said rollers 46 47 are not mounted directly in the side frames 20 21 of the machine, but are carried in suitable bearings formed in swinging arms 48 49, respectively, supported upon the upper edges of the side frames 20 21, respectively, as shown in Figs. 1 and 2. The arms 48 49 are mounted at their forward ends on pivots 50, so that by elevating their rear or left-hand ends, as shown in Figs. 1 and 2, the presser-rollers 46 47 may be moved away from the composition bars, as shown in dotted lines in Fig. 1, thereby permitting the operator to have access to said bars. When the arms 48 49 are in their lower position, at which time they rest on the upper surfaces of the side frames, as shown in Figs. 1 and 2, the rollers 46 47 are in operative position adjacent to and partly in contact with the upper surfaces of the bars of composition. The arms 48 49 are locked in operative position by spring-latches 51, the upper ends of which are secured to the brackets 26 27, the lower ends extending in an inclined direction over the adjacent ends of the arms 48 49, as shown in Figs. 1 and 2 and also illustrated in Figs. 15 and 16. The latches 51 are of spring material and are so adjusted that while they normally project over the ends of the arms 48 49 they may be drawn back so as to release said arms and permit of their being raised, as shown by dotted lines in Fig. 1. For the purpose of drawing back said latches a lever 52 is provided at one side of the machine, said lever being mounted upon a suitable shaft 53, the ends of which are journaled in the brackets 26 27, as shown in Figs. 1 and 2. The lever 52 is provided at its lower end with a collar 54, which fits upon the shaft 53, adjacent to a horizontal plate 55, which forms a part of the latch 51, and said collar is provided with a pin 56, which projects into a slot 57 in said plate 55, so that by rocking the shaft 53 the spring-latch 52 may be moved into or out of operative position. A similar collar 58 is provided at the opposite end of the shaft 53 for operating the latch 51 at that side of the machine, as shown in Fig. 3.

For raising and lowering the arms 48 49, with the presser-rollers, a lever 59 is provided at one side of the machine, said lever being mounted on a shaft 60, which is suitably supported by the side frames at the feed end of the machine, as shown in Fig. 1. Said shaft 60 carries adjacent to each side frame a projecting arm 61, which is connected by a connecting-bar 63 with the free end of the arm 48 or 49 at the same side of the machine, as shown in Fig. 1. The lever 59 stands normally in a more or less vertical position, the other parts then being in the positions shown in full lines in Fig. 1. When the lever 59 is thrown down to the position shown in dotted lines in Fig. 1, the arms 61 and connecting-bars 62 assume the positions shown in dotted lines in said figures, throwing up the arms 48 49, as shown. When the lever 59 is in its lowermost position, it is held in such position by reason of the fact that the pivot connecting the arm 61 and bar 62 crosses a line drawn from the upper pivot of said bar through the shaft 60. It is also locked by a spring-latch 63. (Best shown in Figs. 1 and 12.) In the construction shown the latch 63 is secured to the leg 24, its upper end lying in the path of movement of the lever 59, so that when said lever is depressed it engages the upper beveled end 64 of said latch, thrusting it aside until the lever passes it, when it springs back over the lever, thereby preventing it from rising. The lever 59 may be released by pressing aside the latch 63.

65 66 indicate gears connected, respectively, with the presser-rollers 46 47, as shown in Figs. 1 and 3. Said gears are arranged at one side of the machine, as shown, and are connected by intermeshing pinions 67 68, as shown in Fig. 1, so that they rotate in opposite directions, as indicated by the arrows in Figs. 1 and 2.

The U-shaped frames 41 42 are held up to press the bars of composition against the fabric by means of weights 69 70, carried at opposite sides of the machines in frames 71 72, respectively. Said frames are pivoted upon a shaft 73, the ends of which are mounted in the side frames 20 21, as shown in Fig. 5, and are connected by rearwardly-extending arms 74 74 with the U-shaped frames 41 42, respectively. The connecting devices are best shown in Figs. 2 and 11. As therein shown, the arms 74 75 embrace the shaft 43. The ends of the shaft 43 are fitted in sliding blocks 76, which move in a horizontally-arranged slot 77 in the horizontal portion of the frames 41 42, as shown in Fig. 2. By this construction when the frames 71 rock on the shaft 73 the arms 74 75 are swung upward or downward, and consequently carry the U-shaped frames 41 42 in a corresponding direction, raising or lowering the bars of composition, and thereby increasing or reducing the pressure of said bars upon the fabric. The object of connecting the arms 74 75 with the U-shaped frames 41 42 in the manner described is to provide the play necessary to the operation described. To strengthen the arms 74 75, webs 78 are provided, which connect the outer portions of said arms with the lower portions of the frames 71 72, respectively. In order to vary the pressure, the weights 69 70 are adjustable backward and forward of the machine—that is to say, their position with reference to the shaft 73 may be adjusted to change the center of gravity of the frames 71 72, and consequently raise or lower the arms 74 75. To this end the weights are carried upon inturned flanges 79, which extend from end to end of said frames 71 72, the weights 69 70 being provided with laterally-projecting shoulders 80, adapted to rest upon said flanges, as shown in Fig. 6. The weights 69 70 are shifted by means of hand-wheels 81 82, respectively, mounted on the outer ends of rods 83 84, which are secured, respectively, to the weights 69 70 and extend through a plate 85, which is secured to the front of each of the frames 71 72, extending from one side to the other of the machine, as shown in Fig. 4. By rotating the hand-wheels 81 82 the weights may be drawn forward or forced backward, as necessary, to secure the desired adjustment. By arranging the frames 70 71 near the sides of the machine the pressure is applied more directly to the ends of the bars of composition, which arrangement I find to be better than to employ a single weight arranged at the center of the machine. The plate 85, which secures the frames 71 72 together, serves to prevent any material difference between the pressure at the two ends of the bar of composition, as it rigidly connects the two frames and equalizes their pressure.

In order to support the forward ends of the pressure-frames 71 72 when the presser-rollers are raised to the position shown in dotted lines in Fig. 1, and consequently resistance to upward movement of the U-shaped frames 41 42 is removed, I provide a supporting-arm 86, which is mounted on a pivot 87, preferably secured to the leg 25, and projects under the frame 71, as shown in Figs. 2 and 4. A lever 88 is connected to the arm 86 for rocking the same to move its inner end upward or downward, and a locking-segment 89 is provided for locking the lever in different positions of adjustment. Preferably the lever 88 and arm 86 are formed integral with each other, being substantially in the form of a bell-crank lever. When the parts are in operative position, the lever 88 is in a vertical position, the arm 86 being a considerable distance below the frame 71. If it be desired to raise the pressure-rollers 46 47 out of operative position, before doing so the lever 88 is thrown forward to raise the arm 86 substantially into contact with the frame 71, the lever being then locked in position, so that when the pressure-rollers 46 47 are raised, thereby removing the resistance to upward movement of the frames 41 42, the forward end of the frame 71 is supported by the arm 86, and consequently cannot swing down, as it would otherwise do. The frame 72 is also held up by reason of its connection with the frame 71 through connecting-plate 85. When the pressure-rollers 46 47 are returned to operative position, the lever 88 is thrown up again, thereby releasing the pressure-frames 71 72, which again become operative.

90 91 indicate upper and lower calendering-cylinders which are placed one above the other at the rear of the machine, as shown in Fig. 2, being mounted in suitable bearings in the side frames 20 21, as best shown in Fig. 6. The cylinders 90 91 are provided with suitable axial passages 92 93 for the admission and discharge of steam. They are also provided, respectively, with intermeshing gears 94 95, by which they are caused to rotate. As shown in Fig. 1, the gear 94 is considerably smaller in diameter than the gear 95, so that the cylinder 90 rotates at a somewhat higher rate of speed than the cylinder 90. As shown by the arrows in Fig. 1, said cylinders rotate in opposite directions.

96 indicates a pinion which connects the gear 95 with the gear 66 for driving the gears 66 and 65 and the presser-rollers, to which they are respectively connected.

97 indicates a pinion which meshes with the gear 95 and is mounted on a shaft 98, which carries a loose pulley 99, arranged adjacent to the side frame 20, as shown in Fig. 5. The shaft 98 also carries a clutch 100, adapted to engage the pulley 99 to cause it to rotate with said shaft. 101 indicates a lever for throwing said clutch into and out of engagement with the pulley 99 for starting or stopping the machine. The clutch mechanism may be of any approved construction.

The calendering-cylinder 90 is adjustable toward and from the cylinder 91, and to this end it is mounted in vertically-adjustable bearing-blocks 102, fitted in suitable ways in the side frames 20 21, as indicated by dotted lines in Fig. 2. This is best secured by grooving the side edges of the blocks 102, as shown at 103 in Fig. 13, which grooves are of suitable width, so that the blocks 102 may fit into slots cut in the side frames, as shown at 104 in Fig. 1, so that the bearing-blocks 102 may move vertically in the side frames. The calendering-cylinder 90 is adjusted vertically by means of levers 105, one at each side of the machine, which levers extend under the blocks 102 and are provided with lugs 106, adapted to engage the under surfaces thereof. The ends of the levers 105 adjacent to the lugs 106 are mounted on pivots 107, secured to the side frames, the opposite ends of said levers extending forward and being connected by links 108 to arms 109, carried by a transverse shaft 110, the ends of which are secured in the side frames 20 21, as shown in Fig. 4. The arrangement of the parts is such that when the bearing-blocks 102 are in their lowermost or normal position the links 108 and arms 109 are out of line. It will be noted, therefore, that by rocking the shaft 110 to move the links 108 and arms 109 more or less into alinement the levers 105 may be thrown upward, thereby raising the bearing-blocks 102 and cylinder 90. The shaft 110 is rocked for this purpose by means of a lever 111, secured upon one end of the shaft 110, as shown in Fig. 4. When the shaft 110 is rocked far enough to carry the pivots which connect the links 108 with the arms 109 across slightly beyond the line drawn from the shaft 110 to the pivots connecting the links 108 with the levers 105, the levers 105, with the bearing-blocks 102, are locked in their raised position; but they may be readily released by rocking the shaft 110 in the opposite direction.

112 113 114 indicate guide-rolls around which the fabric is conducted before it passes between the first pressure-roller 46 and the composition bar 37. The rollers 113 114 are placed between the upright arms of the frames 41 42 in order to conduct the fabric to a point forward of the roller 46, so that it may be properly fed between the presser-roller 46 and the composition bar 37 as the roller 46 rotates in the direction indicated by the arrow in Fig. 2.

115 indicates a shaft which is mounted in the side frames 20 21 adjacent to the upper calendering-cylinder 90, as shown in Figs. 2, 9, and 10. The ends of said shaft are mounted in boxes 116, which are pressed yieldingly toward the cylinder 90 by springs 117, arranged in suitable pockets in the side frames, as shown in Fig. 10. The shaft 115 carries near its ends rollers 118, which are best constructed of a number of strips 119 of leather, felt, or other suitable material, pressed tightly between disks 120, as shown in Fig. 10. The rollers 118 are adapted to engage the fabric and press it yieldingly against the surface of the cylinder 90. The shaft 115 also carries a pair of oppositely-inclined spreader-disks 121, which are similar in construction to the rollers 118, but are non-circular. As best shown in Fig. 9, the disks 121 are cam-shaped, the object being to cause them to intermittently engage the fabric as they rotate. By inclining the disks 121 they have a tendency to press the fabric laterally, so that as the shaft 115 rotates they intermittently engage the fabric and move it laterally, smoothing out wrinkles and creases and causing it to be wound properly after treatment. Owing to the fact that the disks 121 are mounted on the shaft 115, they also engage the cylinder 90 yieldingly.

122 indicates a mandrel on which the fabric is wound after it passes between the calendering-cylinders 90 91. As shown in Figs. 6 and 7, said mandrel is arranged to rise vertically between uprights 123 124, carried by the side frames 20 21 at each side of the cylinder 90. The upright 123 is rigidly secured to a suitable standard 125, while the upright 124 is pivoted to a standard 126, secured to the side frame, on which it is carried. It will be understood that similar uprights are provided at each side of the machine. By this construction the uprights 124 may be turned down for the removal of the mandrel with the roll of fabric wound upon it. The uprights are locked together in operative position by a spring-latch 127, as shown in Fig. 7. In order to secure sufficient friction between the mandrel 122 or the roll of fabric being wound upon it and the cylinder 90, weights 128 are provided, one at each side of the machine, said weights being arranged to rest upon the ends of the mandrel 122 and being guided by the uprights 123 124. The arrangement of the weights is best shown in Figs. 7 and 8. It will be observed from an inspection of Fig. 8 that each weight is composed of parallel bars 129 130, secured together by transverse pins 131 132. The pins 132 are arranged centrally of the bars 129 130 one above the other and carry antifriction-rollers 133 134, as shown in Fig. 7. The rollers 133 134 are adapted to bear against the uprights 123 124 when they are in their vertical position and to run upon the upright 124 when said upright is turned down for the removal of the mandrel. The rollers 134 also run on the ends of the mandrel, reducing friction at those points. The pins 131 are placed adjacent to the outer edges of the uprights 124, as shown in Fig. 7. By this construction when the uprights 124 are turned down the weights 128 are carried with them and are restored to their operative position between the uprights when the uprights 124 are returned to their vertical position.

The operation is as follows: The fabric enters the machine at the left-hand end, as shown in Fig. 2, passing over the spreader 30, which spreads the fabric properly for its passage through the machine. The fabric then follows the course indicated by dotted lines in Fig. 2 passing over the rolls 31, 35, 36, 32, 112, 113, and 114 in the order named. These rolls produce sufficient friction to place the fabric under tension enough to cause it to pass smoothly into the machine. The fabric then passes between composition bar 37 and presser-roller 46, where it receives an application of the composition over its lower entire surface. From presser-roller 46 it passes between presser-roller 47 and composition-bar 38, the untreated surface of the fabric being now below, receiving a similar coating of the composition. The fabric then passes over roll 50, under calendering-cylinder 91, and thence around said cylinder between it and cylinder 90. During its passage around said calendering-cylinders the fabric is heated and pressed, so that the composition is thoroughly incorporated in it. The calendering-cylinders also operate to draw the fabric through the machine. The fabric then passes up between cylinder 90 and the rollers and disks carried by shaft 115 and is pressed laterally by the disks 121, which remove any wrinkles or creases that may remain after the previous treatment. The fabric is then wound upon the mandrel 122, the latter being rotated by frictional engagement with the cylinder 90. As the fabric is wound upon it the mandrel gradually rises until the piece of fabric has all been treated, when the mandrel is removed by unhooking the latch 127 and turning down the uprights 124.

When for any purpose, such as threading the machine, it is desired to separate the calendering-cylinders 90 91, this may be accomplished by properly operating the lever 111, as already described. The presser-rollers 46 47 may be raised when it is desired to have access to the composition bars or to the inner portion of the machine and also for inserting the bars of composition, which may be introduced by endwise movement of the bars, which enter through suitable openings in the side frames. (Shown in Fig. 1.) The pressure of the bars of composition against the fabric is regulated, as already described, by adjusting the position of the weights 69 70, such adjustment being effected by rotating the hand-wheels 81 82.

As it is almost invariably the case that the width of the fabric treated is less than the length of the composition bars, I have provided for the automatic grinding down of the portions of the bars that project beyond the edges of the fabric, so that the upper surfaces of the composition bars are always on a level. I accomplish this by providing slight spiral corrugations or grooves in the surfaces of the presser-rollers 46 47, as shown in Fig. 3. The corrugations of each roller extend spirally in opposite directions from the center of each roller. This not only has the effect of grinding down the projecting portions of the composition bars, as above described, but also serves to further press out laterally the fabric under treatment. Moreover, the opposite spiral grooves also serve to carry the composition shavings up at the sides of the machine instead of carrying them in at one side, as would be the case if a continuous spiral were provided.

I have explained that the upper calendering-cylinder 90 is driven by a smaller gear than that which drives the lower cylinder 91, and consequently moves at a higher surface speed than said lower cylinder. The advantage of this construction is that the upper cylinder not only lays the nap of the fabric, but also presses it.

By my improved machine the fabrics treated have the composition thoroughly incorporated in them and are delivered smoothly wound after having been pressed and ironed and are not stretched out of their normal condition. Moreover, they are in a non-shrinkable condition. If desired, only one surface of the fabric need be treated, as by removing one of the presser-rollers or one of the composition bars the composition will be applied to one side only.

While I have stated that I prefer to use the composition set forth in my former patent, above referred to, in connection with my improved machine, it should be understood that my improved mechanism is not restricted to use with such composition. I wish it to be understood, further, that so far as concerns the generic claims for the mechanism for varying the pressure of the composition on the fabric they are not to be restricted to securing this result by adjusting the position of the composition, as it may also be secured by adjusting the position of the presser-rollers without moving the composition.

I have particularly described my improved machine as illustrated in the accompanying drawings; but it should be understood that my invention is not restricted to the specific details of the construction described, except in so far as such details are particularly claimed.

That which I claim as my invention, and desire to secure by Letters Patent, is—

1. A machine for treating fabrics to render them water-repellent comprising means for applying the water-repellent substance in the form of a solid bar directly to the fabric, and means for holding the bar of water-repellent material so that the weight thereof does not rest on the fabric.

2. A machine for treating fabrics to render them water-repellent, comprising means for supporting the water-repellent substance in the form of a solid bar, means for conducting the fabric over and closely in contact with said water-repellent substance, and means for heating and pressing the fabric after the water-repellent substance has been applied thereto, substantially as described.

3. A machine for treating fabrics to render them water-repellent, comprising means for supporting the water-repellent substance in the form of a solid bar, means for conducting the fabric over and closely in contact with the bar of said water-repellent substance, means for heating and pressing the fabric after the water-repellent substance has been applied thereto, and means for varying the quantity of the water-repellent substance applied to the fabric, substantially as described.

4. A machine for treating fabrics to render them water-repellent, comprising means for supporting the water-repellent substance in the form of a solid bar, means for conducting the fabric over and closely in contact with the bar of said water-repellent substance, means for heating and pressing the fabric after the water-repellent substance has been applied thereto, and means for varying the pressure of said water-repellent substance against the fabric, substantially as described.

5. A machine for treating fabrics to render them water-repellent, consisting of means for applying the water-repellent substance in solid form to opposite surfaces of the fabric, means for holding the water-repellent substance in contact with the opposite surfaces of the fabric, and means for heating and pressing the fabric, substantially as described.

6. A machine for treating fabrics to render them water-repellent comprising means for applying the water-repellent substance in the form of a solid bar directly to opposite surfaces of the fabric, and means for holding the water-repellent material so that the weight thereof does not rest on the fabric.

7. A machine for treating fabrics to render them water-repellent, consisting of means for holding a plurality of bars of water-repellent composition, means for conducting one surface of the fabric into contact with the surface of one of said bars, means for conducting the opposite surface of the fabric into contact with the surface of the other bar of composition, and means for heating and pressing the fabric, substantially as described.

8. A machine for treating fabrics to render them water-repellent, consisting of means for holding a plurality of bars of water-repellent composition, means for conducting one surface of the fabric into contact with the surface of one of said bars, means for conducting the opposite surface of the fabric into contact with the surface of the other bar of composition, means for heating and pressing the fabric, and means for adjusting the pressure with which the composition is applied to the fabric, substantially as described.

9. A machine for treating fabrics to render them water-repellent, comprising means for supporting a bar of water-repellent substance, a presser-roll for pressing the fabric in contact with the bar of water-repellent substance, means for heating and pressing the fabric after the water-repellent substance has been applied thereto, and means engaging with said supporting means and adapted to prevent the weight of the bar of water-repellent substance resting upon the fabric.

10. A machine for treating fabrics to render them water-repellent, comprising means for supporting a bar of water-repellent substance, a presser-roll for pressing the fabric into contact with the bar of water-repellent substance, means for heating and pressing the fabric after the water-repellent substance has been applied thereto, means for conducting the fabric over and in contact with the bar of water-repellent material, and means for adjusting the position of the water-repellent substance to vary the quantity applied to the fabric, substantially as described.

11. A machine for treating fabrics to render them water-repellent, comprising means for supporting a bar of water-repellent substance, a presser-roll for pressing the fabric into contact with the bar of water-repellent substance, means for heating and pressing the fabric after the water-repellent substance has been applied thereto, and an adjustable support for said presser-roller, substantially as described.

12. A machine for treating fabrics to render them water-repellent, comprising means for supporting the water-repellent substance, a presser-roll for pressing the fabric into contact with the water-repellent substance, means for heating and pressing the fabric after the water-repellent substance has been applied thereto, and swinging arms in which said presser-roller is mounted, substantially as described.

13. A machine for treating fabrics to render them water-repellent, comprising means for supporting the water-repellent substance, a presser-roll for pressing the fabric into contact with the water-repellent substance, means for heating and pressing the fabric after the water-repellent substance has been applied thereto, swinging arms in which said presser-roller is mounted, and lever mechanism for adjusting the position of said presser-roller, substantially as described.

14. A machine for treating fabrics to render them water-repellent, comprising means for supporting a bar of water-repellent composition, a presser-roller mounted parallel with and adjacent to said bar of composition, a supporting device for said roller adapted to be moved to carry said presser-roller toward and from said bar, and means engaging with and adapted to suitably move the supporting device, substantially as described.

15. A machine for treating fabrics to render them water-repellent, comprising means for supporting a bar of water-repellent composition, a presser-roller mounted parallel with and adjacent to said bar of composition, a supporting device for said roller adapted to be moved to carry said presser-roller toward and from said bar, and lever mechanism for adjusting the position of said presser-roller, substantially as described.

16. A machine for treating fabrics to render them water-repellent, comprising means for holding a plurality of bars of water-repellent composition, a presser-roller arranged parallel with and adjacent to each of said bars, a movable support for said presser-rollers, said support being adjustable to carry said rollers toward or from their respective bars of composition, means for rotating said rollers, and lever mechanism for adjusting the position of said rollers, substantially as described.

17. A machine for treating fabrics to render them water-repellent, comprising a supporting-frame, means for supporting a plurality of bars of water-repellent composition, swinging arms pivoted at opposite sides of the frame, presser-rollers journaled in said bars and adapted to lie parallel with and adjacent to said bars of composition, means for rotating said rollers, and lever mechanism for adjusting the position of said arms, substantially as described.

18. A machine for treating fabrics to render them water-repellent, comprising vertically-adjustable U-shaped frames at opposite sides of the machine, adapted to support bars of water-repellent composition, presser-rollers arranged adjacent to and parallel with said bars of composition, and means for vertically adjusting said U-shaped frames, substantially as described.

19. A machine for treating fabrics to render them water-repellent, comprising means for supporting a bar of water-repellent substance in contact with the fabric, a presser-roller arranged adjacent to and parallel with said water-repellent substance, and counterbalance mechanism for controlling the pressure with which the water-repellent substance is applied to the fabric, substantially as described.

20. A machine for treating fabrics to render them water-repellent, comprising means for supporting a bar of water-repellent substance, a presser-roller arranged adjacent to and parallel with said water-repellent substance, and an adjustable counterbalance-weight for regulating the pressure with which the water-repellent substance is applied to the fabric, substantially as described.

21. A machine for treating fabrics to render them water-repellent, comprising means for supporting a bar of water-repellent substance, a presser-roller arranged adjacent to and parallel with said water-repellent substance, a swinging frame for regulating the pressure with which the water-repellent substance is applied to the fabric, and an adjustable weight carried by said pressure-frame, substantially as described.

22. A machine for treating fabrics to render them water-repellent, comprising vertically-adjustable means for supporting the bar of water-repellent composition, means for conducting the fabric over and in contact with said bar of composition, and a swinging pressure-frame connected with said supporting means for regulating the pressure of the composition on the fabric, said pressure-frame carrying an adjustable weight, substantially as described.

23. A machine for treating fabrics to render them water-repellent, comprising a plurality of U-shaped frames adapted to support bars of water-repellent composition, means for conducting the fabric into contact with said bars of composition, a swinging pressure-frame for moving said U-shaped frames vertically, and an adjustable weight carried by said pressure-frame, substantially as described.

24. A machine for treating fabrics to render them water-repellent, comprising a plurality of U-shaped frames adapted to support bars of water-repellent composition, means for conducting the fabric into contact with said bars of composition, swinging pressure-frames at opposite sides of the machine and connected with said U-shaped frames for moving the same vertically, and adjustable weights carried by said pressure-frames, substantially as described.

25. A machine for treating fabrics to render them water-repellent, comprising a plurality of U-shaped frames adapted to support bars of water-repellent composition, means for conducting the fabric into contact with said bars of composition, a swinging pressure-frame for moving said U-shaped frames vertically, an adjustable weight carried by said pressure-frame, and an adjustable stop adapted to be moved under the forward end of said pressure-frame for supporting the same, substantially as described.

26. A machine for treating fabrics to render them water-repellent, comprising vertically-adjustable means for supporting a bar of water-repellent composition, a presser-roller arranged above and adjacent to the bar of composition, adjustable supports for said roller, whereby it may be moved toward or from said bar of composition, means for locking said roller in operative position adjacent to said bar of composition, a swinging pressure-frame adapted to press said bar of composition against the fabric under treatment, and an adjustable weight carried by said pressure-frame, substantially as described.

27. A machine for treating fabrics to render them water-repellent, comprising vertically-adjustable means for supporting a bar of water-repellent composition, a presser-roller arranged above and adjacent to the bar of composition, adjustable supports for said roller, whereby it may be moved toward or from said bar of composition, means for locking said roller in operative position adjacent to said bar of composition, a swinging pressure-frame adapted to press said bar of composition against the fabric under treatment, an adjustable weight carried by said pressure-frame, and an adjustable stop for supporting said pressure-frame when the presser-roller is moved out of operative position, substantially as described.

28. A machine for treating fabrics to render them water-repellent, comprising means for supporting a bar of water-repellent composition, a presser-roller for causing the fabric to move over and in contact with said bar of composition, and means for grinding down the bar of composition beyond the margins of the fabric, substantially as described.

29. A machine for treating fabrics to render them water-repellent, comprising means for supporting a bar of water-repellent composition, and a presser-roller for causing the fabric to move over and in contact with said bar of composition, the surface of said presser-roller being spirally grooved, the grooves at the opposite ends of the roller being oppositely arranged, substantially as described.

30. A machine for treating fabrics to render them water-repellent comprising means for applying the water-repellent substance in the form of a solid bar to the fabric, and counterbalance mechanism adapted to hold the bar of water-repellent substance so that the weight thereof does not rest on the fabric.

31. A machine for treating fabrics to render them water-repellent, comprising means for applying the water-repellent substance in solid form to the fabric, means for heating and pressing the fabric, and means for smoothing the fabric, substantially as described.

32. A machine for treating fabrics to render them water-repellent, comprising means for applying the water-repellent substance to the fabric, calendering-cylinders for heating and pressing the fabric, and means adjacent to the calendering-cylinders for smoothing the fabric, substantially as described.

33. A machine for treating fabrics to render them water-repellent, comprising means for applying the water-repellent substance to the fabric, calendering-cylinders for heating and pressing the fabric, and rollers adjacent to and coacting with one of said calendering-cylinders for smoothing the fabric, substantially as described.

34. A machine for treating fabrics to render them water-repellent, comprising means for applying the water-repellent substance to the fabric, calendering-cylinders for heating and pressing the fabric, and oppositely-inclined disks near the ends of one of said calendering-cylinders for smoothing the fabric, substantially as described.

35. A machine for treating fabrics to render them water-repellent, comprising means for applying the water-repellent substance to the fabric, calendering-cylinders for heating and pressing the fabric, and oppositely-inclined intermittently-acting disks near the ends of one of said calendering-cylinders for smoothing the fabric, substantially as described.

36. A machine for treating fabrics to render them water-repellent, comprising means for applying the water-repellent substance to the fabric, calendering-cylinders for heating and pressing the fabric, one of said cylinders being mounted in adjustable bearings, whereby it may be moved toward and from the other, and mechanism for adjusting said adjustable cylinder, substantially as described.

37. A machine for treating fabrics to render them water-repellent, comprising means for applying the water-repellent substance to the fabric, calendering-cylinders for heating and pressing the fabric, one of said cylinders being mounted in adjustable bearings, whereby it may be moved toward and from the other, and lever mechanism for adjusting the position of said movable cylinder, substantially as described.

38. A machine for treating fabrics to render them water-repellent, comprising means for applying the water-repellent substance to the fabric, calendering-cylinders for heating and pressing the fabric, and means for rotating one of said cylinders at a higher rate of speed than the other, substantially as described.

39. A machine for treating fabrics to render them water-repellent consisting of a means for holding a plurality of bars of water-repellent composition, means for conducting one surface of the fabric into contact with the surface of one of said bars, means for conducting the opposite surface of the fabric into contact with the surface of the other bar of composition, means for sustaining the bars of water-repellent substance so that the weight thereof will not rest upon the fabric, and means for heating and pressing the fabric, substantially as described.

40. A machine for treating fabrics to render them water-repellent, comprising means for applying the water-repellent substance to the fabric, calendering-cylinders for heating and pressing the fabric, and a mandrel mounted parallel with and bearing against one of said calendering-cylinders for receiving and rolling up the treated fabric, substantially as described.

41. A machine for treating fabrics to render them water-repellent, comprising means for applying the water-repellent substance to the fabric, calendering-cylinders for heating and pressing the fabric, a mandrel mounted parallel with and bearing against one of said calendering-cylinders for receiving and rolling up the treated fabric, and vertically-adjustable weights at the ends of said mandrel, substantially as described.

42. A machine for treating fabrics to render them water-repellent, comprising means for applying the water-repellent substance to the fabric, calendering-cylinders for heating and pressing the fabric, a mandrel mounted parallel with and bearing against one of said calendering-cylinders for receiving and rolling up the treated fabric, a pair of vertical guide-bars at each end of said mandrel, one guide of each pair being hinged, and locking mechanism for holding said guides in operative position, substantially as described.

43. A machine for treating fabrics to render them water-repellent, comprising means for applying the water-repellent substance to the fabric, calendering-cylinders for heating and pressing the fabric, a mandrel for winding up the fabric, guides for the ends of said mandrel, and weights above the ends of said mandrel, each of said weights having an antifriction-roller adapted to bear on the adjacent end of the mandrel, substantially as described.

44. A machine for treating fabrics to render them water-repellent, comprising means for applying the water-repellent substance to the fabric, calendering-cylinders for heating and pressing the fabric, a mandrel for winding up the fabric, guides for the ends of said mandrel, and weights above the ends of said mandrel, each of said weights having a pair of antifriction-rollers adapted to bear on said guides, one of the rollers of each weight being adapted to bear on the adjacent end of the mandrel, substantially as described.

45. A machine for treating fabrics to render them water-repellent, comprising means for applying the water-repellant substance to the fabric, calendering-cylinders for heating and pressing the fabric, a mandrel for winding up the fabric, guides for the ends of said mandrel, and weights above the ends of said mandrel and embracing said guides, each of said weights having a pair of antifriction-rollers adapted to bear on said guides, one of the rollers of each weight being adapted to bear on the adjacent end of the mandrel, substantially as described.

46. A machine for treating fabrics to render them water-repellent, comprising means for applying the water-repellent substance to the fabric, calendering-cylinders for heating and pressing the fabric, disks arranged adjacent to and coacting with one of said calendering-cylinders, and means for yieldingly pressing said disks against said cylinder, substantially as described.

47. A machine for treating fabrics to render them water-repellent, consisting of means for holding a plurality of bars of water-repellent composition, means for conducting one surface of the fabric into contact with the surface of one of said bars, means for conducting the opposite surface of the fabric into contact with the surface of the other bar of composition, means for heating and pressing the fabric, means for adjusting the pressure with which the composition is applied to the fabric, and means for preventing the weight of the water-repellent composition from resting on the fabric, substantially as described.

48. A machine for applying a solid matter to fabrics, comprising means for continuously moving a web of the fabric, means for applying solid matter directly to the fabric while it is in motion, and means for preventing the weight of the solid matter from resting upon the fabric.

49. A machine for applying solid matter to fabrics, comprising means for continuously moving a web of the fabric, means for holding the bar of the matter to be applied thereto in contact with the fabric while it is in motion, and means for preventing the weight of the bar of the matter from resting upon the fabric.

50. A machine for treating fabrics to render them water-repellent, comprising a holder for the water-repellent material which is applied directly to the fabric, and a counterbalance mechanism connected with the holder and adapted to control the pressure of the water-repellent material on the fabric.

CHARLES LICHTENSTADT.

Witnesses:
JOHN L. JACKSON,
ALBERT H. ADAMS.